United States Patent [19]
Yang

[11] Patent Number: 5,493,425
[45] Date of Patent: Feb. 20, 1996

[54] OPTICAL PICKUP APPARATUS HAVING A QUADRANT HOLOGRAM AND A QUADRANT PHOTO DETECTOR

[75] Inventor: Keun Y. Yang, Kyungki-Do, Rep. of Korea

[73] Assignee: Goldstar Co., Ltd., Seoul, Rep. of Korea

[21] Appl. No.: 143,145

[22] Filed: Oct. 29, 1993

[30] Foreign Application Priority Data

Nov. 6, 1992 [KR] Rep. of Korea ............... 20835/1992

[51] Int. Cl.[6] .................. G02B 5/32; G11B 7/00
[52] U.S. Cl. ................... 359/15; 369/44.41; 369/103
[58] Field of Search ............... 359/15, 16; 369/44.37, 369/44.12, 44.41, 103

[56] References Cited

U.S. PATENT DOCUMENTS

| | | | |
|---|---|---|---|
| 4,817,074 | 3/1989 | Yamanaka | 369/44.37 |
| 4,907,847 | 3/1990 | Onayama et al. | |
| 4,929,823 | 5/1990 | Kato et al. | 369/44.37 |
| 4,945,529 | 7/1990 | Ono et al. | 369/44.12 |
| 5,018,804 | 5/1991 | Jung et al. | |
| 5,060,212 | 10/1991 | Fujita et al. | |
| 5,062,098 | 10/1991 | Hori et al. | |
| 5,065,380 | 11/1991 | Yokota | 369/44.12 |
| 5,105,076 | 4/1992 | Premji | 369/44.37 |
| 5,107,477 | 4/1992 | Fujita et al. | |
| 5,144,606 | 9/1992 | Kadowaki | 369/44.37 |
| 5,195,072 | 3/1993 | Fukui et al. | 369/44.41 |
| 5,253,237 | 10/1993 | Miyake et al. | 369/44.37 |
| 5,253,585 | 9/1993 | Hoshino et al. | 369/44.12 |
| 5,293,367 | 3/1994 | Kadowaki et al. | 369/44.12 |
| 5,391,865 | 2/1995 | Kurata et al. | 369/44.37 |

FOREIGN PATENT DOCUMENTS

| | | |
|---|---|---|
| 0195657 | 9/1986 | European Pat. Off. . |
| 0460368 | 12/1991 | European Pat. Off. . |
| 0539217 | 4/1993 | European Pat. Off. . |
| 1577877 | 10/1980 | United Kingdom . |
| 2059664 | 4/1981 | United Kingdom . |

*Primary Examiner*—Frank Gonzalez
*Assistant Examiner*—Jason D. Eisenberg

[57] ABSTRACT

An optical pickup system using a holographic optical element for achieving miniaturization and lightness. This optical pickup system comprises a semiconductor laser for generating a laser beam, an objective lens for focusing the laser beam emitted from the semiconductor laser on an optical disk, a quadrant hologram for diffracting and condensing the laser beam, reflected by the optical disc and transmitted through the objective lens, to a quadrant photo detector, and the quadrant photo detector detecting the laser beam, diffracted and condensed by the quadrant hologram, and reading data recorded on the optical disc. The quadrant hologram and the quadrant photo detector are arranged in such a manner that the optical paths of the first to fourth hologram members of the quadrant hologram pass through the centers of the first, third, second and fourth photo detecting members of the quadrant photo detector, respectively. The laser beam is condensed by the first hologram member after passing through the first photo detecting member, condensed by the second hologram member before passing through the third photo detecting member, condensed by the third hologram member before passing through the second photo detecting member, and condensed by the fourth hologram member after passing through the fourth photo detecting member.

6 Claims, 7 Drawing Sheets

5,493,425

OPTICAL PICKUP APPARATUS HAVING A QUADRANT HOLOGRAM AND A QUADRANT PHOTO DETECTOR

BACKGROUND OF THE INVENTION

1. Field of the Invention

The present invention relates in general to an optical pickup system used in, for example, a compact disc player, for reading data recorded on an optical disc, and more particularly to an optical pickup system using a holographic optical element in order to achieve the recent trend of miniaturization and lightness.

2. Description of the Prior Art

Recently, the use of optical discs such as compact discs and laser discs has greatly increased. In the future, these optical discs will be used in all technical fields, by virtue of being able to store a lot of information and being convenient to use.

Such optical discs require an optical pickup system for reading information recorded thereon.

With reference to FIG. 1, a known optical pickup system comprises a semiconductor laser 3 used as a light source, and a half mirror 2 reflecting the laser beam emitted from the semiconductor laser 3. In order to read the information recorded on an optical disc 1, the laser beam reflected by the half mirror 2 is focused on the disc 1. To achieve the above object, a 45° reflection mirror 4 and a focusing lens 5 are positioned between the half mirror 2 and the optical disc 1. Here, the 45° reflection mirror 4 reflects the laser beam reflected by the half mirror 2 to the focusing lens 5 which focuses the laser beam on the disc 1. The known optical pickup system further includes a condensing lens 6 which condenses the laser beam, reflected by the optical disc 1, to a photo detector 7 which detects the condensed laser beam so as to read the information recorded on the disc 1.

In the above optical pickup system, the laser beam emitted from the laser diode 3 is reflected by the half mirror 2 and in turn focused on the optical disc 1 by way of the 45° reflection mirror 4 and the focusing lens 5.

The laser beam focused on the optical disc 1 is, thereafter, reflected by the disc 1 and varies in its light intensity in accordance with different shapes of the recorded bumps or pits of the optical disc 1. The laser beam reflected by the disc 1 passes through the above optical path in reverse. That is, the reflected laser beam is transmitted through the half mirror 2 and condensed by the condensing lens 6 to the photo detector 7 adapted for detecting laser beam.

The intensity of the laser beam condensed by the condensing lens 6 is detected by the photo detector 7, thereby achieving the reading of the information recorded on the optical disc 1.

However, the known optical pickup system undesirably has a relatively large volume since the optical elements are spaced at individual intervals. Additionally, the semiconductor laser 3 and the photo detector 7 are separately provided in the optical pickup system and this makes the size of the pickup system be larger and the weight of the pickup system be heavy. Also, a relative long time elapses until the laser beam, reflected to and focused on the optical disc 1, reaches the photo detector 7, As a result known optical pickup system performs the information reading operation slowly.

Furthermore, all the elements of the known pickup system should be separately mounted and this requires a longer assembling time, which results in a increase of the manufacturing cost of the system.

SUMMARY OF THE INVENTION

It is, therefore, an object of the present invention to provide an optical pickup system in which the aforementioned problems are overcome and which achieves miniaturization and lightness by using a holographic optical element.

To accomplish the above object, an optical pickup system of the present invention comprises a semiconductor laser generating a laser beam, an objective lens focusing a laser beam emitted from the semiconductor laser on an optical disc, a quadrant hologram diffracting and condensing the laser beam, reflected by the optical disc and transmitted through the objective lens, to a quadrant photo detector, and the quadrant photo detector detecting the laser beam, diffracted and condensed by the quadrant hologram, and reading data recorded on the optical disc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings which are given by way of illustration only, and thus are not limitative of the present invention, in which:

FIGS. 9 and 10 are schematic side views showing focusing errors of the optical pickup system of the present invention, respectively, in which:

FIG. 9 shows a focusing error caused by an axially distant displacement of the optical disc; and FIG. 10 shows a focusing error caused by an axially approaching displacement of the optical disc;

DESCRIPTION OF THE PREFERRED EMBODIMENTS

Figure 1:
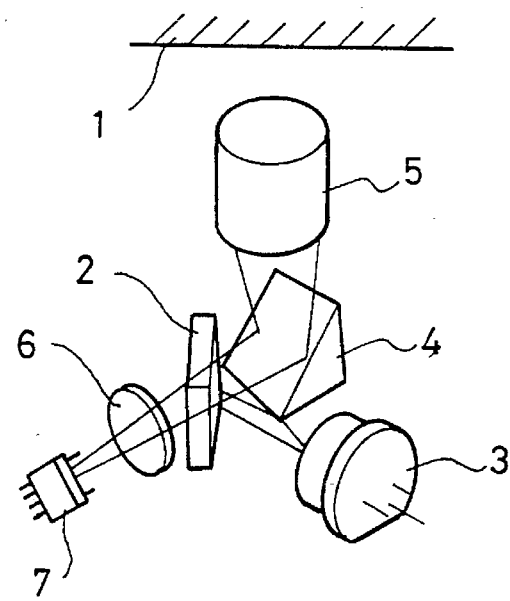
FIG. 1 is a schematic perspective view of an optical pickup system in accordance with the prior art.
Figure 3:
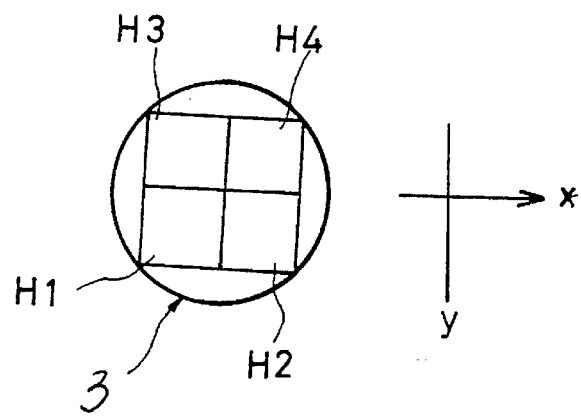
FIG. 3 is an enlarged plan view of a quadrant hologram of the optical pickup system of the present invention.
Figure 2:
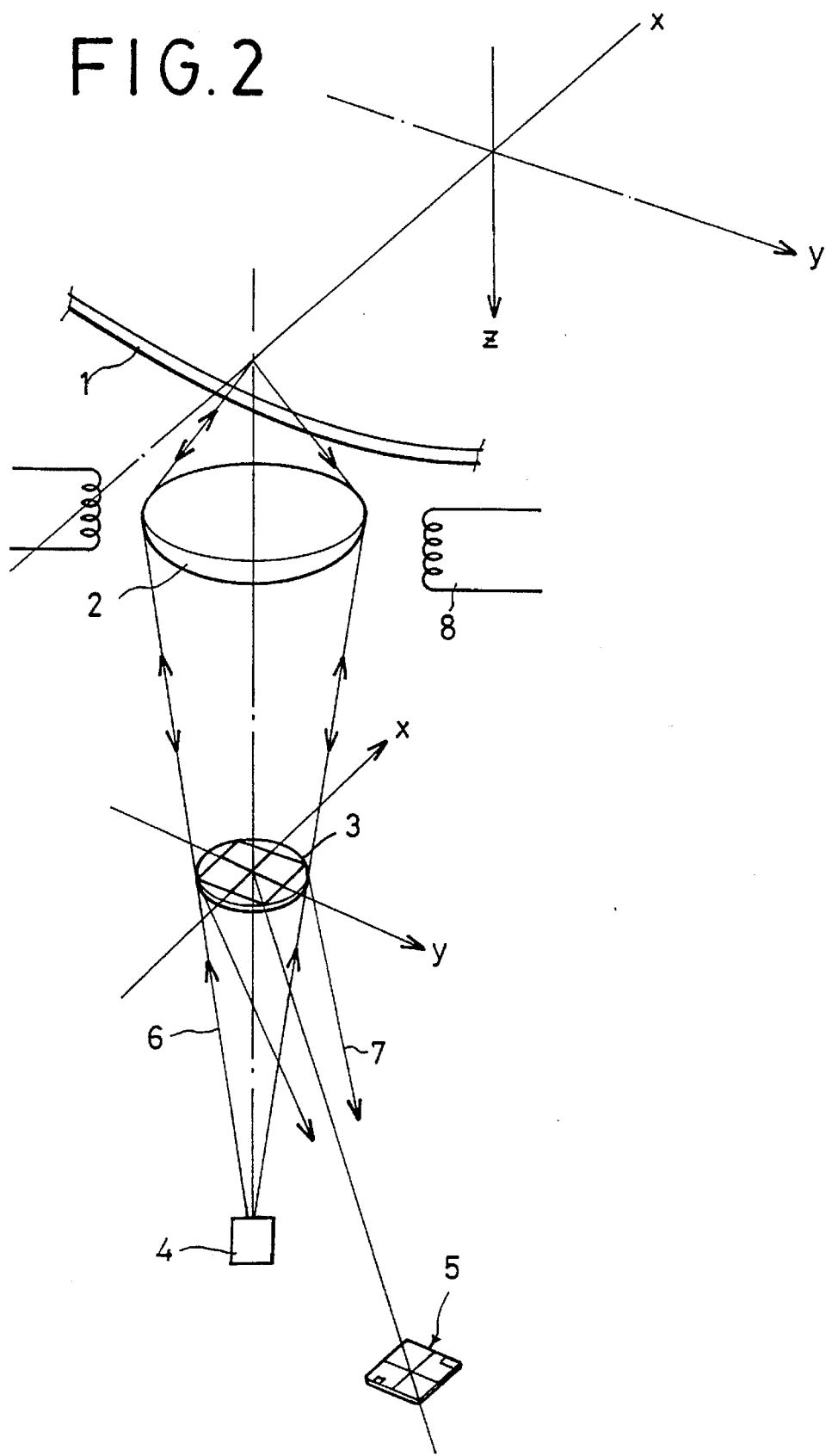
FIG. 2 is a schematic perspective view of an optical pickup system in accordance with an embodiment of the present invention.

With reference to FIG. 2, there is shown in a schematic perspective view an optical pickup system in accordance with an embodiment of the present invention. The optical pickup system comprises a semi conductor laser 4 used as a laser source generating a laser beam 6, and an objective lens 2 focusing the laser beam 6, which is emitted from the semiconductor laser 4, on an optical disc 1. The system further comprises a quadrant hologram 3 which has first to fourth hologram members $H_1$, $H_2$, $H_3$ and $H_4$ and diffracts and condenses the laser beam having been reflected by the optical disc 1 and transmitted through the objective lens 2, to a quadrant photo detector 5. The quadrant photo detector 5 detects the laser beam, diffracted and condensed by the quadrant, hologram 3, and reads data recorded on the optical disc 1. This quadrant photo detector 5 has first to fourth photo detecting members $P_1$, $P_2$, $P_3$ and $P_4$.

Figure 5:
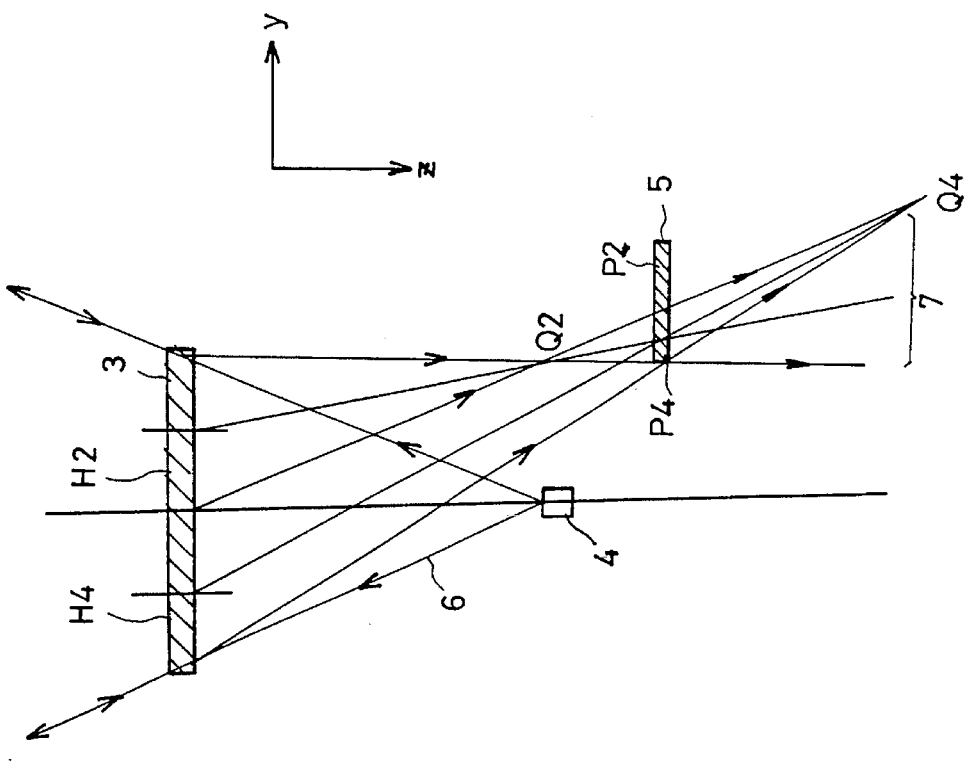
FIGS. 4 and 5 show laser beams diffracted and condensed by individual hologram members of the quadrant hologram and detected by individual photo detecting members of a quadrant photo detector, respectively
Figure 4:
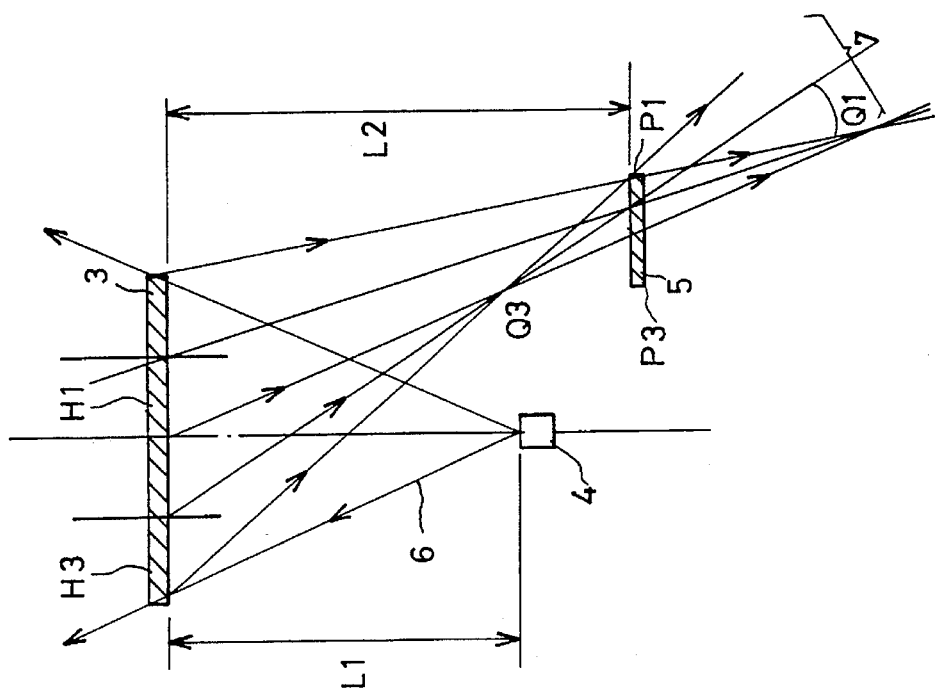

Turning to FIG. 4 and 5, the quadrant hologram 3 arranged in the optical pickup system in such a manner that, the optical path of the first hologram member $H_1$ passes through the center of the first photo detecting member $P_1$ of the quadrant photo detector 5, the optical path of the second hologram member $H_2$ passes through the center of the third photo detecting member $P_3$, the optical path of the third hologram member $H_3$ passes through the center of the second photo detecting member $P_2$, and the optical path of the fourth hologram member $H_4$ passes through the center of the fourth photo detecting member $P_4$. In Manufacture of the quadrant hologram 3, each of the points of the reference beams of the first to fourth hologram members $H_1$ to $H_4$ of the quadrant hologram 3 is equal to a light emitting point of the semiconductor laser 4 which is vertically spaced apart therefrom by a distance $L_1$, and the points of the object beams of the first to fourth hologram members $H_1$ to $H_4$ are $Q_1$, $Q_2$, $Q_3$ and $Q_4$, respectively. In this case, the laser beam condensed by the first hologram member $H_1$ is condensed after it passes through the first photo detecting member $P_1$ of the quadrant photo detector 5, the laser beam condensed by the second hologram member $H_2$ is condensed before it passes through the third photo detecting member $P_3$, the laser beam condensed by the third hologram member $H_3$ is condensed before it passes through the second photo detecting member $P_2$, and the laser beam condensed by the fourth hologram member $H_4$ is condensed after it passes through the fourth photo detecting member $P_4$.

Here, the points $Q_1$, $Q_2$, $Q_3$, and $Q_4$ of the object beams of the first to fourth hologram members $H_1$ to $H_4$ are set under the following relations.

$$Q_1(z) > L_2,\ Q_4(z) > L_2,\ Q_2(z) < L_2,\ Q_3(z) < L_2,$$

and $$Q_1(x) < 0,\ Q_2(x) < 0,\ Q_3(x) > 0,\ Q_4(x) > 0$$

In addition, the sizes of the first to fourth photo detecting members $P_1$, $P_2$, $P_3$ and $P_4$ are determined in such a manner that they are equal to areas of the laser beam intercepted by the photo detecting members at a position, which is vertically spaced apart from the quadrant hologram 3 by the distance $L_2$, when the laser beam is precisely focused on the optical disc 1.

In arrangement of the elements of the optical pickup system, the semiconductor laser 4 is arranged on the center axis of the quadrant hologram 3. In order to cause a larger change on the photo detector 5 when the focused position of the laser beam on the optical disc 1 is changed, the quadrant photo detector 5 is arranged so as to be spaced apart from the quadrant hologram 3 by the distance $L_2$ longer than the distance $L_1$ between the quadrant hologram 3 and the semiconductor laser 4. Otherwise stated, $L_1 < L_2$.

Figure 15:
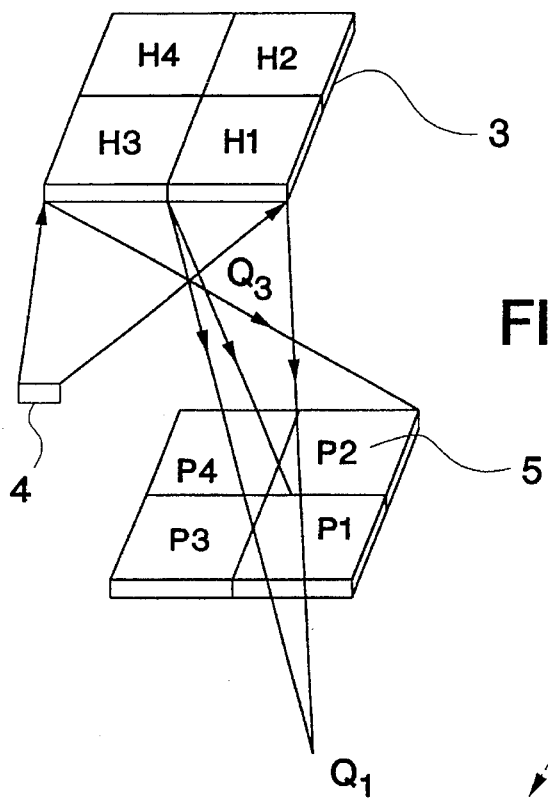
FIGS. 15 and 16 show examples of optical paths between the hologram members of the quadrant hologram and the photo detector members of the quadrant detector, in accordance with an embodiment of the present invention.
Figure 16:
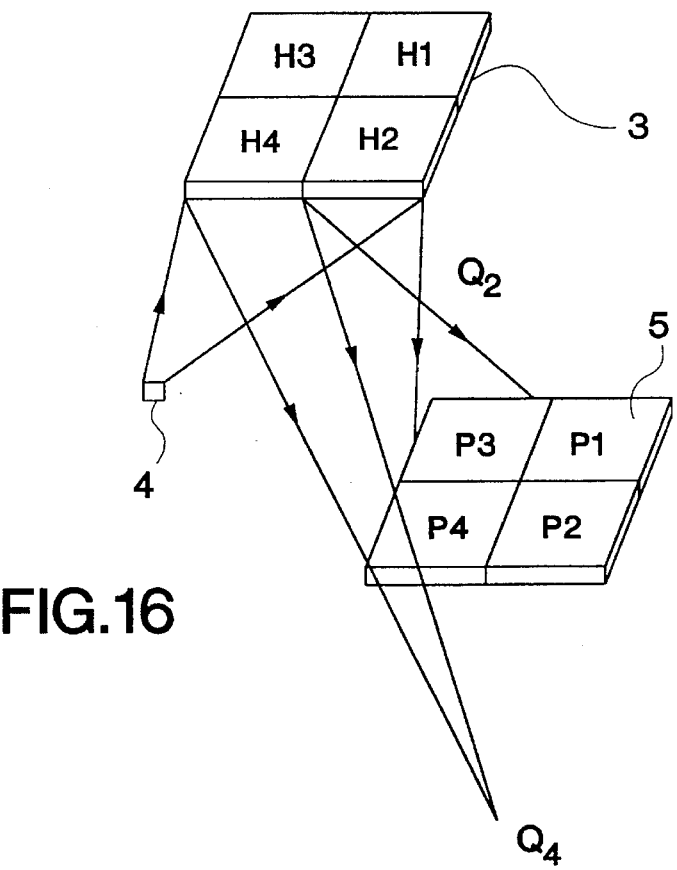

The construction of the laser beam diffracted and condensed by individual hologram members of the quadrant hologram 3 and detected by individual photo detecting members of the quadrant photo detector 5 will be explained in more detail. As shown in FIGS. 15 and 16, H1 is condensed at Q1 after passing through P1, H3 is condensed at Q3 before passing through P2, H2 is condensed at Q2 before passing through P3, and H4 is condensed at Q4 after passing through P4. In the drawings, the x-direction is the vertical direction with respect to the x- and y-plane.

The operational effect of the optical pickup system of this invention will be given hereinbelow in conjunction with the accompanying drawings.

As shown in FIGS. 2, 4 and 5, when the laser beam 6 emitted from the semiconductor laser 4 is received by the quadrant hologram 3, part of the incident laser beam is diffracted by the first to fourth hologram members $H_1$ to $H_4$ of the hologram 3 in order to deviate from the objective lens 2. On the contrary, 0th diffraction laser beam, otherwise stated, undiffracted laser beam is received by the objective lens 2 and in turn focused on the optical disc 1 by the lens 2.

The laser beam focused on the optical disc 1 as described above is, thereafter, reflected by the optical disc 1 and reversely passes through the above optical path in order become a condensed beam which is condensed to the semiconductor laser 4 by the objective lens 2. When the condensed beam is received by the quadrant hologram 3, it becomes reference beams of the first to fourth hologram members $H_1$ to $H_4$, thus to regenerate the object beams 7 of the hologram members $H_1$ to $H_4$ which are condensed to the points $Q_1$, $Q_2$, $Q_3$ and $Q_4$ by the hologram members $H_1$ to $H_4$, respectively.

The optical paths of the regenerated object beams 7 pass through the centers of the first to fourth photo detecting members $P_1$, $P_2$, $P_3$ and $P_4$ of the quadrant photo detector 5, respectively, which are spaced apart from the quadrant hologram 3 by the distance $L_2$ as shown in FIGS. 4 and 5. These photo detecting members $P_1$, $P_2$, $P_3$ and $P_4$ thus generate signals for reading the data recorded on the optical disc 1.

Figure 6:
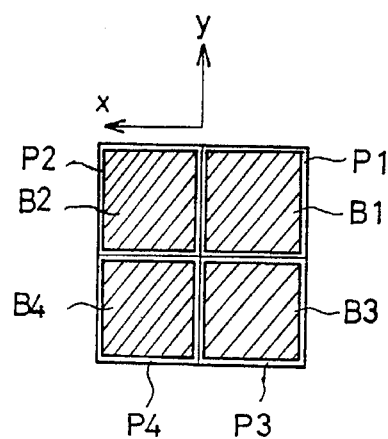
FIGS. 6 to 8 show a change of sizes of the laser beams, detected by the photo detecting members of the quadrant photo detector, in accordance with a focusing error of the optical pickup system.

In optical pickup operation of the optical pickup system, when the laser beam is precisely focused on the optical disc 1 (otherwise stated, there is no focusing error, that is, $d_1 = d_2$), and reflected by the optical disc 1 to the quadrant hologram 3, and diffracted and condensed by the quadrant hologram 3 to the quadrant photo detector 5, the sizes $B_1$, $B_2$, $B_3$ and $B_4$ of the laser beams intercepted by the first to fourth photo detecting members $P_1$ to $P_4$ are equal to each other as shown in FIG. 6.

That is, the laser beams detected by the first to fourth photo detecting members $P_1$ to $P_4$ of the quadrant photo detector 5 are equal to each other in their light intensities.

Figure 9:
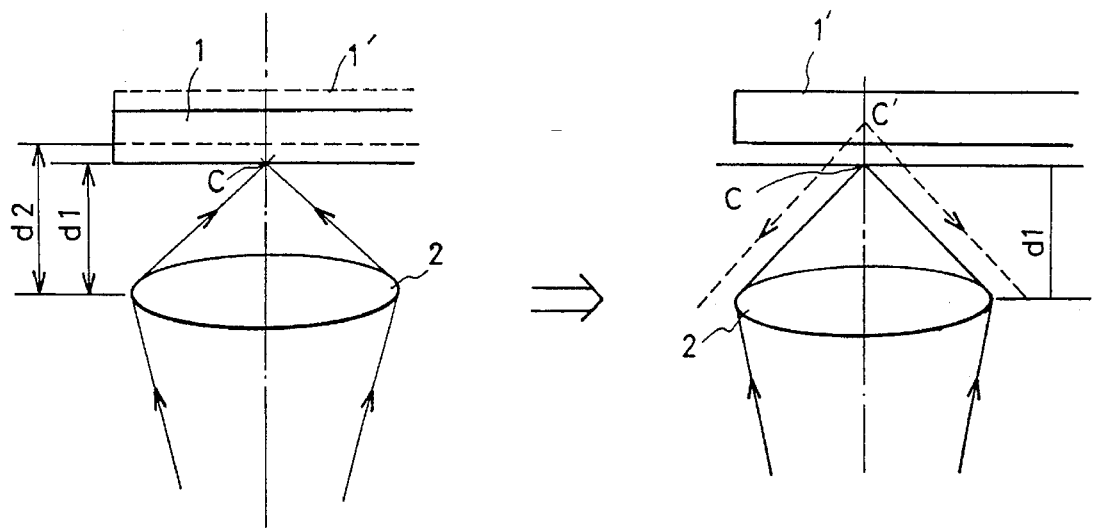

When the optical disc 1 is displaced to become more distant from the objective lens 2 such that it is placed on a position exceeding the focused position of the laser beam focused by the objective lens 2, that is, $d_2>d_1$, as shown in FIG. 9, the focused position of the laser beam moves from a position c to another position c'. In this case, the size of the laser beam condensed to a photo detector $PD_2$ placed on a position exceeding an image producing position c" corresponding to the focused position c becomes larger from H1 to H2. On the contrary, the size of the laser beam condensed to a photo detector $PD_1$ placed on a position before the image producing position c" becomes smaller from H3 to H4.

Figure 10:
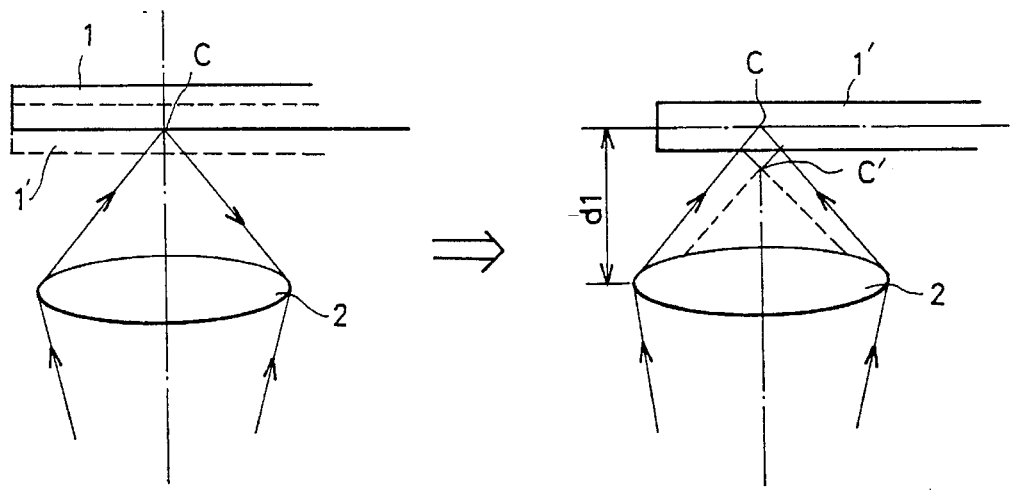
Figure 11:
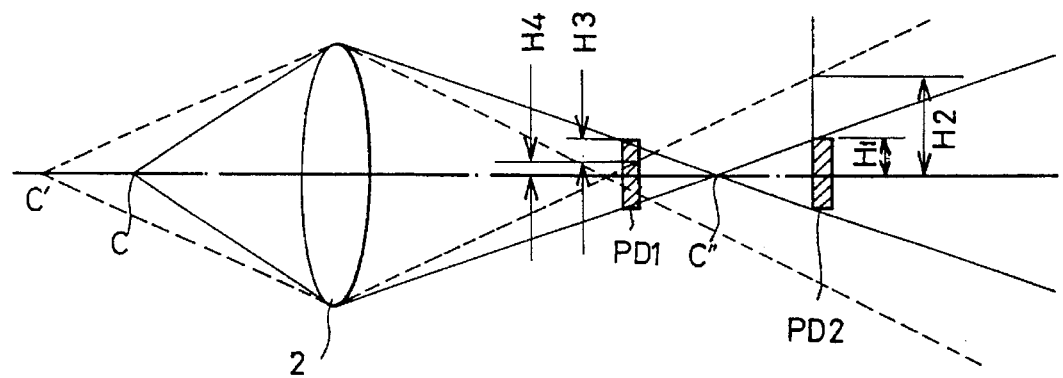
FIG. 11 shows a change of the sizes of the laser beams, detected by the quadrant photo detector, in accordance with the focusing error of the optical pickup system.

However, when the optical disc 1 is displaced to approach the objective lens 2 such that it is placed on a position before the focused position of the laser beam, that is, $d_2<d_1$, as shown in FIG. 10, the focused position of the laser beam moves from the position c to another position c'. In this case, the size of the laser beam condensed to the photo detector $PD_2$ placed on the position exceeding the image producing position c" becomes smaller. On the contrary, the size of the laser beam condensed to the photo detector $PD_1$ placed on the position before the image producing position c" becomes larger.

Figure 7:
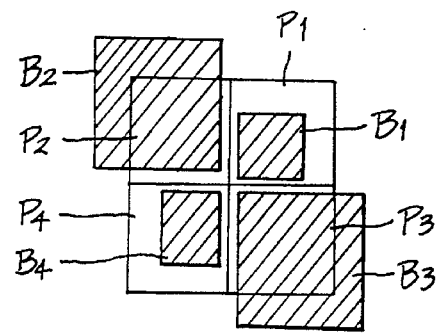

As described above, when there is no focusing error, that is, $d_1=d_2$, as shown in FIG. 6, the laser beams detected by the first to fourth photo detecting members $P_1$ to $P_4$ of the quadrant photo detector 5 are equal to each other in their light intensities. However, when the optical disc 1 is displaced to approach the objective lens 2 such that the distance $d_2$ is shorter than the distance $d_1$ as shown in FIG. 10, the sizes of the laser beams condensed to the first and fourth photo detecting members $P_1$ and $P_4$ become smaller while the sizes of the laser beams condensed to the second and third photo detecting members $P_2$ and $P_3$ become larger as shown in FIG. 7. The light intensities of the laser beams detected by the first and fourth photo detecting members $P_1$ and $P_4$ are higher than those of the laser beams detected by the second and third photo detecting members $P_2$ and $P_3$.

Figure 8:
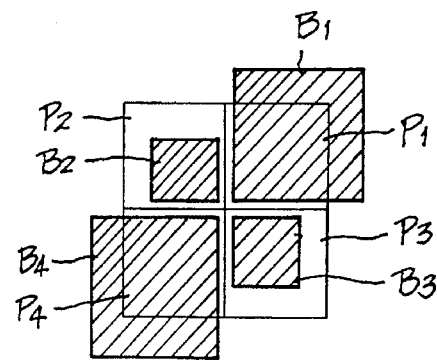

On the contrary, when the optical disc 1 is displaced to become more distant from the objective lens 2 such that the distance $d_2$ is larger than the distance $d_1$ as shown in FIG. 9, the sizes of the laser beams condensed to the first and fourth photo detecting members $P_1$ and $P_4$ become larger while the sizes of the laser beams condensed to the second and third photo detecting members $P_2$ and $P_3$ become smaller as shown in FIG. 8. The light intensities of the laser beams detected by the first and fourth photo detecting members $P_1$ and $P_4$ are lower than those of the laser beams detected by the second and third photo detecting members $P_2$ and $P_3$.

Therefore, when a summed signal of electric signals s1 and s4 of the first and fourth photo detecting members $P_1$ and $P_4$ is compared with a summed signal of electric signals s2 and s3 of the second and third photo detecting members $P_2$ and $P_3$, it is detected whether there is a focusing error of the optical pickup system. The result information of the comparison of the summed signals is inputted to an actuator 8 which is adapted for adjusting the objective lens 2 vertically and radially. The actuator 8 shifts the objective lens 2 vertically and radially in accordance with the inputted information of the comparison of the summed signals, thus to compensate the focusing error of the optical pick up system. The comparison of the summed signals is represented by the following relation $$(s1+s4)-(s2+s3)=FS.$$

In the above relation, when the result signal FS is a positive signal, it means that the optical disc 1 is displaced to become more distant from the objective lens 2 such that the distance $d_2$ is larger than the distance $d_1$ as shown in FIG. 9. Hence, the actuator 8 shifts the objective lens 2 toward the optical disc 1 in order to cause the laser beam to be precisely focused on the optical disc 1, thus to compensate the focusing error. On the contrary, when the result signal FS is a negative signal, it means that the optical disc 1 is displaced to approach the objective lens 2 such that the distance $d_2$ is shorter than the distance $d_1$ as shown in FIG. 10. Hence, the actuator 8 shifts the objective lens 2 away from the optical disc 1 in order to cause the laser beam to be precisely focused on the optical disc 1, thus to compensate the focusing error.

Figure 13:
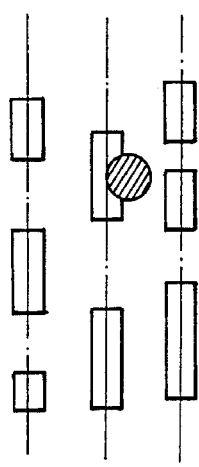
FIGS. 13 and 14 are views corresponding to FIG. 12, but showing the optical discs radially displaced in order to cause tracking errors, respectively.
Figure 14:
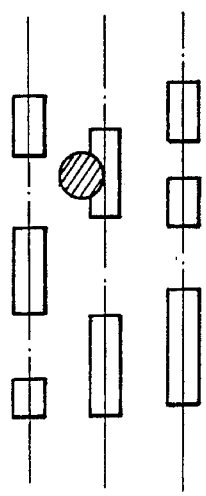

In addition, there may occur a tracking error in rotation of the optical disc 1 as shown in FIGS. 13 and 14. That is, the optical disc 1 is slightly displaced in the radial direction in its rotation, so that the laser beam is not exactly focused on a pit of the optical disc 1 but focused on a position straying from the desired pit in the $-x$ or $+x$ direction, thereby causing the tracking error.

Figure 12:
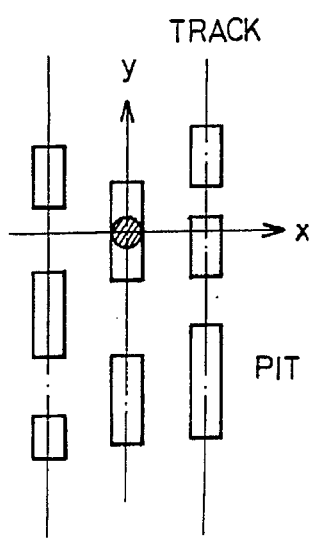
FIG. 12 shows pits of the optical disc when the laser beam is exactly focused on a pit.

In the optical pickup system of this invention, when there is no tracking error as shown in FIG. 12, the light intensities of the incident laser beams of the first and third hologram members $H_1$ and $H_3$ which are placed in the $-x$ direction are equal to those of the incident laser beams of the second and fourth hologram members $H_2$ and $H_4$ which are placed in the $+x$ direction. Thus, the summed signal s1+s2 of the signals s1 and s2 detected by the first and second photo detecting members $P_1$ and $P_2$ of the quadrant photo detector 5 is equal to the summed signal s3+s4 of the signals s3 and s4 detected by the third and fourth photo detecting members $P_3$ and $P_4$ of the quadrant photo detector 5.

That is, $$(s1+s2)-(s3+s4)=TS>0.$$

However, when the laser beam is not exactly focused on a pit of the optical disc 1 but focused on a position straying from the desired pit in the $+x$ direction in order to cause a tracking error as shown in FIG. 13, the light intensities of the incident laser beams of the first and third hologram members $H_1$ and $H_3$ are higher than those of the incident laser beams of the second and fourth hologram members $H_2$ and $H_4$. Thus, the summed signal s1+s2 of the signals detected by the photo detecting members $P_1$ and $P_2$ is larger than the summed signal s3+s4 of the signal s detected by the photo detecting members $P_3$ and $P_4$.

That is, $$(s1+s2)-(s3+s4)=TS>0.$$

On the contrary, when the laser beam is focused on a position straying from the desired pit of the optical disc 1 in the $-x$ direction in order to cause a tracking error as shown in FIG. 14, the summed signal s1+s2 is smaller than the summed signal s3+s4.

That is, $$(s1+s2)-(s3+s4)=TS<0.$$

When the signal TS is a positive signal, the actuator 8 radially shifts the objective lens 2 in the $-x$ direction in order to cause the laser beam to be precisely focused on the desired pit of the optical disc 1, thus to compensate the tracking error. On the contrary, when the signal TS is a negative signal, the actuator 8 radially shifts the objective lens 2 in the $+x$ direction in order to cause the laser beam to be precisely focused on the desired pit of the optical disc 1, thus to compensate the tracking error.

Tn order to read the data recorded on the optical disc 1, all the signals of the first to fourth photo detecting members $P_1$ to $P_4$ of the quadrant photo detector 5 are summed in order to obtain a summed signal S. Thereafter, it is determined, in accordance with intensity of the summed signal S, whether the laser beam is focused on a pit.

That is, $$s1+s2+s3+s4=S.$$

In the above relation, the summed signal S is higher when the laser beam is focused on a portion of the optical disc 1 having no pit than when the laser beam is focused on a portion of the optical disc 1 having a pit.

In accordance with the aforementioned theory, the optical pickup system of the present invention compensates the focusing error as well as the tracking error and reads the data recorded on the optical disc 1.

As described above, an optical pickup system of the present invention carries out a desired optical pickup operation using a hologram as an optical element and constructs the semiconductor laser and the photo detector in a module, thereby achieving miniaturization and lightness of the system and reducing the time for reading the data recorded on the optical disc, and resulting in improvement of the information reading velocity of data playback apparatus, such as a compact disc player (CDP), a video disc player (VDP), an optical disc driver (ODD) and a multi disc player (MDP) using the optical pickup device. In addition, the optical pickup device using the hologram of the present invention is easily assembled and prepared in mass production with lower manufacturing cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pickup apparatus having a quadrant hologram, comprising:

a semiconductor laser for generating a laser beam;

an objective lens for focusing the laser beam, generated from said semiconductor laser, on an optical disk; and a hologram for condensing the laser beam, reflected by said optical disk and transmitted through said objective lens, to a photo detector, wherein said hologram is a quadrant hologram having first to fourth hologram members, said photo detector detecting the laser beam, condensed thereto by said hologram, and reading data recorded on said optical disk, wherein said photo detector is a quadrant photo detector having first to fourth photo detecting members, said quadrant hologram and said quadrant photo detector being arranged such that an optical path of said first hologram member passed through a center of said first photo detecting member, an optical path of said second hologram member passes through a center of said third photo detecting member, an optical path of said third hologram member passes through a center of said second photo detecting member, and an optical path of said fourth hologram passes through a center of said fourth photo detecting member, so that a tracking error of said optical pickup apparatus is compensated by a difference between a summed signal of said first and second photo detecting members and a summed signal of said third and fourth photo detecting members, and a summed signal of said first to fourth photo detecting members is used for reading the data recorded on said optical disc.

2. The optical pickup apparatus having a quadrant hologram of claim 1, wherein a laser beam condensed by said first hologram member is condensed after passing through said first photo detecting member, a laser beam condensed by said second hologram member is condensed before passing through said third photo detecting member, a laser beam condensed by said third hologram member is condensed before passing through said second photo detecting member, and a laser beam condensed by said fourth hologram member is condensed after passing through said fourth photo detecting member.

3. The optical pickup apparatus having a quadrant hologram of claim 1, wherein a reference beam point of said hologram is located near said semiconductor laser and object beam points of said hologram are related according to:

$$Q_1(z)>L_2, Q_4(z)>L_2, Q_2(z)<L_2, Q_3(z)<L_2,$$

$$Q_1(x)<0, Q_2(x)<0, Q_3(x)>0, Q_4(x)>0,$$

wherein $L_2$ is a distance between said hologram and said photo detector $Q_1$ is an object beam point of the first hologram member;

$Q_2$ is an object beam point of the second hologram member;

$Q_3$ is an object beam point of the third hologram member; and $Q_4$ is an object beam point of the fourth hologram member.

4. The optical pickup apparatus having a quadrant hologram of claim 1, wherein a size of said photo detector is determined in accordance with a size of said laser beam intercepted by said first to fourth photo detecting members when said laser beam is precisely focused on said optical disc, and said photo detector is spaced apart from said hologram by a distance longer than a distance between said hologram and said semiconductor laser in order to cause a change of the size of said laser beam on said photo detector to become larger when a focused position of said laser beam on said optical disc is changed.

5. The optical pickup apparatus having a quadrant hologram of claim 1, wherein a focusing error of said optical pickup system is compensated by a difference between a summed signal of said first and fourth photo detecting members and a summed signal of said second and third photo detecting members.

6. The optical pickup apparatus having a quadrant hologram of claim 5, wherein said differences of the summed signals are caused by change of the sizes of said laser beams condensed to said first to fourth photo detecting members of said photo detector.

* * * * *